Feb. 20, 1962 G. H. MAINS ETAL 3,022,203

PROCESS FOR STRIP TREATMENT

Original Filed Nov. 2, 1955 3 Sheets-Sheet 1

INVENTORS
GERALD H. MAINS,
LEON W. McGINNIS &
JOSEPH S. TATNALL

BY Connolly and Hutz

ATTORNEYS

INVENTORS
GERALD H. MAINS,
LEON W. McGINNIS &
JOSEPH S. TATNALL

BY Connolly and Hutz
ATTORNEYS

Feb. 20, 1962 G. H. MAINS ETAL 3,022,203

PROCESS FOR STRIP TREATMENT

Original Filed Nov. 2, 1955 3 Sheets-Sheet 3

INVENTORS
GERALD H. MAINS,
LEON W. McGINNIS &
JOSEPH S. TATNALL

BY Connolly and Hutz
ATTORNEYS 3,022,203
Patented Feb. 20, 1962

1

3,022,203

PROCESS FOR STRIP TREATMENT

Gerald H. Mains, Chester County, Pa., and Leon W. McGinnis and Joseph S. Tatnall, New Castle County, Del., assignors to National Vulcanized Fibre Co., Wilmington, Del., a corporation of Delaware Original application Nov. 2, 1955, Ser. No. 544,564, now Patent No. 2,993,492, dated July 25, 1961. Divided and this application June 9, 1960, Ser. No. 43,264
6 Claims. (Cl. 134—15)

This invention relates to a process for treating one surface of a moving strip with a liquid treating agent. More particularly, the process of the present invention accomplish the aforesaid treatment of but one surface of the strip without mechanically contacting either strip surface during the treating operation.

In the art of treating a strip of metal or other material, it is often desirable to treat one surface with a liquid treating agent while the opposite surface remains free of contact with the treating agent. It is also found desirable to be able to treat but one surface while avoiding mechanical contact with that surface as well as the opposite surface. For example, certain products require a uniformity of chemical treatment which will not permit mechanical contact with the treated surface during the treating operation and at the same time, the reverse surface might be highly polished or in some other condition prohibiting mechanical contact during the chemical treatment.

It will be understood by those skilled in the art that although the present invention is described in an environment in which one surface of a copper foil is treated in order to improve its characteristics for bonding that surface to a dielectric material for forming a printed circuit, the invention is equally applicable to any liquid contact surface treatment of a liquid treating agent impervious material, particularly when but one surface is to be treated and it is desirable to avoid mechanical contact with both surfaces during treatment.

In the manufacture of printed circuits, it is conventional to bond a copper foil to the dielectric material with an adhesive. By a subsequent operation, the circuit pattern is formed on the dielectric by etching or otherwise removing the undesired areas of copper foil. It is essential that the copper foil be securely bonded to the dielectric. For this purpose, it is conventional to oxidize the surface of the foil which is to be bonded to the dielectric by the use of a liquid treating agent. Among the various methods of oxidizing, one method is to oxidize both surfaces of the copper foil, bond one surface of the copper foil to the dielectric and then reduce the exposed oxidized surface of the foil so that it will be suitable for making electrical connection thereto, as by soldering. This method, besides requiring an unneeded oxidation and subsequent reduction of the exposed surface, results in the loss of copper and does not obtain a conductor circuit of uniform thickness. Other manufacturers have attempted to treat but one surface of the foil. In general, most of these attempts have been unsuccessful at least to the extent that uniformity of surface oxidation on the desired surface has not been obtained while completely avoiding oxidation of the total area of the reverse side.

Another difficulty encountered in such prior art treatments is lack of uniformity of treatment, i.e., uniformity of surface oxidization. Lack of uniformity is objectionable because the bonding strength between the foil and dielectric varies from one area to the next. In those areas where surface oxidization has not been adequate, bonding failures may occur and as a result an inferior or defective product is obtained.

2

Furthermore, since the conductor foil for forming printed circuits may be of the order of 0.001 inch thickness, strips of this material cannot be continuously fed through treating apparatus of the aforesaid type without encountering difficult tracking problems. Thus, uneven windings of the strip on the parent feed roll cause such problems with the result that users of the heretofore designed apparatus have found treatment of one surface difficult if not impossible because the continuously moving strip will not center itself and remain so over the treating zones. Thus, although many processes of and apparatus for such treatment have been proposed, one of their inherent difficulties has been the lack of a suitable means to overcome the tracking problem. It will be appreciated that the use of a conventional guiding method where a finger rides against the edge of the copper foil and is in turn connected to a control mechanism for a skew roll is not an effective means of solving the tracking problem because of the fragile nature of this extremely thin strip.

Accordingly, it is an object of the present invention to provide a process for continuously treating one surface of a strip with a liquid treating agent while avoiding treating agent contact with the other surface of the strip.

Another object of the present invention is to provide a process for continuously treating one surface of a strip with a liquid treating agent while avoiding treating agent contact with the other surface of the strip and simultaneously avoiding mechanical contact with either surface of the strip during the actual treating operation.

Another object of the present invention is to provide a process for obtaining uniformity of treatment of one surface of a moving strip with a liquid treating agent while avoiding contact with the other surface of the strip with the treating agent and simultaneously avoiding mechanical contact with either surface of the strip during the actual treating operation.

Another object of the present invention is to provide a process for continuously treating but one surface of a moving strip as aforesaid wherein proper tracking is obtained while avoiding mechanical contact with the edges of the strip.

These and other objects of the present invention will become more apparent upon considering the following description thereof taken in conjunction with the drawings wherein.

In accordance with the present invention, it has been found that it is possible to float a longitudinally moving strip on the surface of a continuous supply of liquid treating agent without exposing the other surface to liquid contact and while avoiding any mechanical contact with either surface or the edges of the strip during the actual treatment operation. In addition to this, and as a result of the specific means utilized for floating the longitudinally moving strip, uniformity of treatment of the entire treated surface area results.

Figure 1:
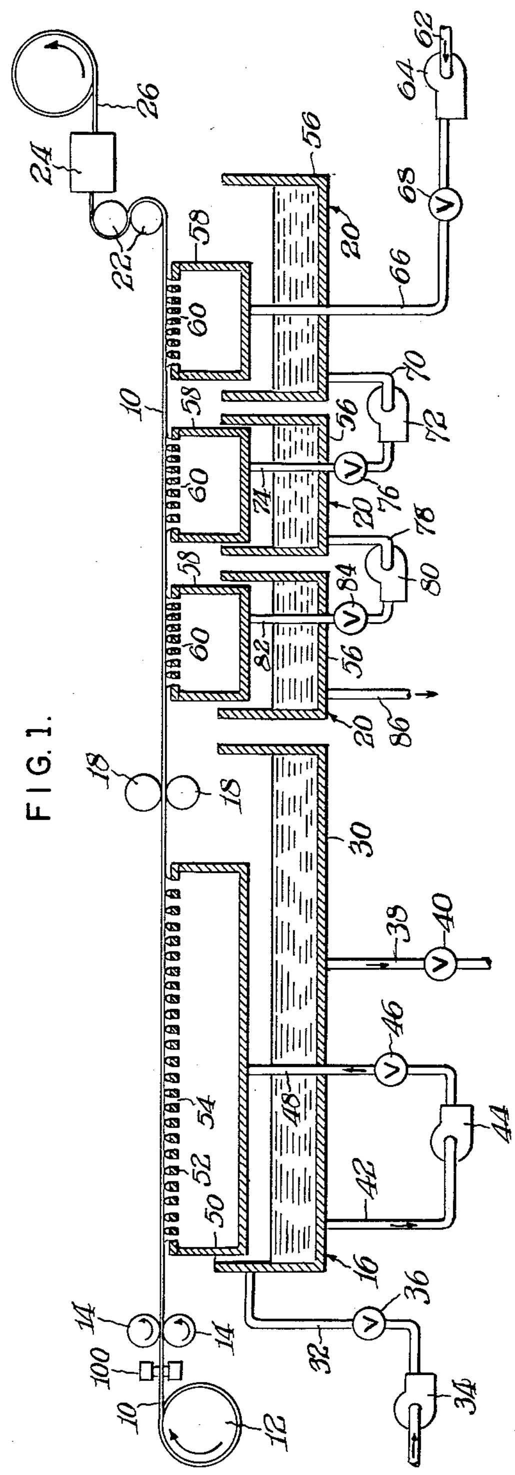
FIG. 1 is a diagrammatic side elevational view of apparatus suitable for the present invention partially in cross-section.
Figure 2:
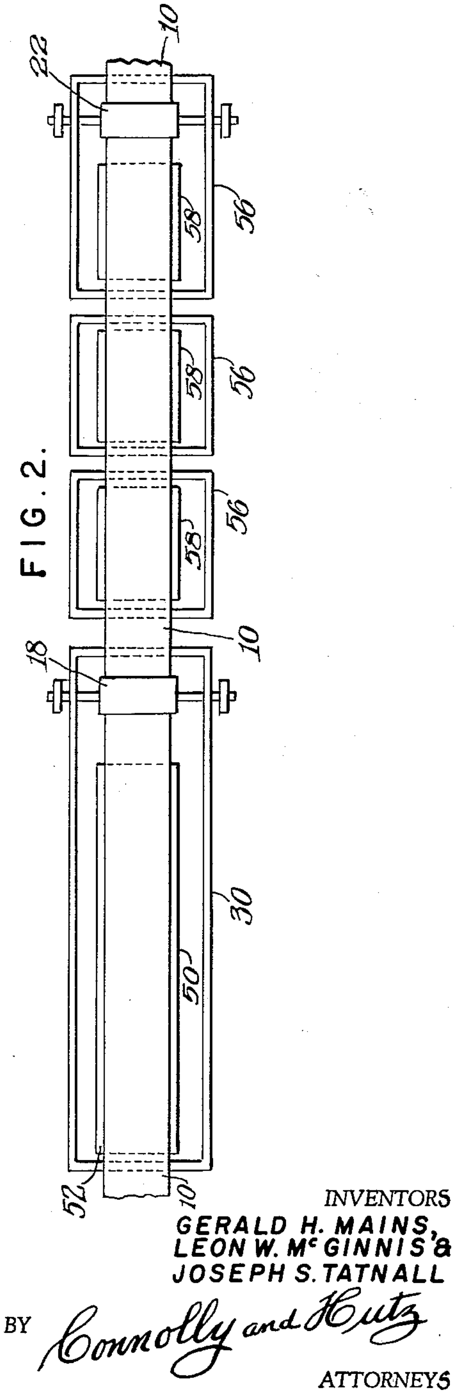
FIG. 2 is a top plan view of a portion of FIG. 1.

With reference to the drawings, particularly FIG. 1 and 2, the strip 10 is fed from parent coil 12 by means of driving rolls 14 across treating apparatus 16, via idling squeegee rolls 18 across a plurality of washing and rinsing apparatus 20, via idling rolls 22 through drying apparatus 24, and is subsequently rewound under positive tension as coil 26. In order to avoid injury to the strip between treatment operations, rolls 14, 18, and 22 are covered with rubber or another relatively soft non-abrasive material.

As shown, apparatus 16 includes reservoir tank 30 open at the top for the purpose of supplying treating liquid. Conduit 32 provides a means for pumping fresh treating liquid via pump 34 and valve 36 to tank 30. Drain conduit 38 and its associated valve 40 provide a means for withdrawing spent treating liquid from tank 30. Conduit 42 leading from tank 30 via pump 44 and valve 46 provides a means for supplying treating liquid under controlled pressure via conduit 48 to distribution means 50. Distribution means 50 which includes bottom and side walls is provided with a top member 52 having a plurality of parallel rows of liquid applying orifices 54 with the rows arranged at an acute angle to the direction of strip movement or travel. Each orifice 54 subtends an incremental width of the strip and has another orifice 54 in the same or a different row subtending a contiguous incremental width of the strip 10. This particular arrangement of orifices in the top member 52 as will be described more fully hereinafter in connection with FIGS. 3 and 4 permits the liquid supply to head 50 via conduit 48 to float the moving strip 10 on the surface of the liquid by liquid contact with the bottom side of the strip only.

The aforesaid floating action of strip 10 on the liquid streams emerging through orifices 54 is accomplished without the need of any mechanical contact with either the top or bottom surface or the edges of the strip 10. This is an extremely important advantage in that neither surface of strip 10 is affected by abrasion or other mechanical action, the bottom surface of strip 10 is assured unformity of treatment over the entire surface area since there is no masking by the presence of any means mechanically contacting the bottom surface of strip 10, and regardless of the thickness of strip 10, particularly when the strip is a foil or other extremely thin material, no mechanical contact means tends to distort or otherwise affect the strip edges.

Run-off treating agent from the distribution head 50 flows down the outer sides of distribution head 50 and is returned to tank 30. A major portion of the liquid film remaining on the bottom surface of the strip after passage over head 50 is removed by squeegee rolls 18. In view of the fact that the treatment occurring in the area above head 50, which in the case of the described embodiment of the present invention amounts to oxidization of the bottom surface, has already occurred, the subsequent squeegee action of rolls 18 does not interfere with uniformity of treatment.

Apparatus units 20 in the illustrated embodiment comprise a series of rinsing or washing zones and in the particular embodiment illustrated provide for countercurrent flow of rinsing water to wash off residual treating agent on the surface of the strip coming from apparatus 16 via squeegee rolls 18. Thus, each of the units 20 includes a tank 56 and a distribution head 58 having orifices 60 therein arranged as described in connection with orifices 54 of distribution head 50. The last unit 20 collects overflow washing water from head 58 which is provided from a source of supply via conduit 62, pump 64, conduit 66 and loading valve 68. The overflow from this unit is passed via conduit 70, pump 72, conduit 74 and loading valve 76 to the head 58 of the second or next to the last unit 20. The overflow from this unit collects in the second or next to the last tank 56 and is passed by conduit 78, pump 80, conduit 82 and loading valve 84 to the head 58 of the first unit 20. The overflow from this treating head flows into its associated tank 56 from which it flows to drain via conduit 86.

The thoroughly rinsed and washed strip then passes through squeegee rolls 22 and, in the event that the washing water used was not sufficiently hot to flash off and thereby obtain a dry strip, it is passed through a drying unit 24 and then wound as coil 28.

It will be understood that by proper adjustment of valves 46, 68, 76 and 84, strip 10, by virtue of the size and arrangement of orifices 54 and 60, is floated on the surface of the treating or washing liquid without the need of any mechanical supporting means over the areas of the treating and washing or rinsing distribution heads 50 and 58 respectively. A specific working embodiment presented hereinafter and including numerical data will provide those skilled in the art with the information necessary for constructing suitable heads 50 and 58 having orifices 54 and 60 of proper size and arrangement for permitting adjustment of the rate of supply of the treating and washing or rinsing agent to obtain this desired floating action.

Figures 3, 4, 6, 7:
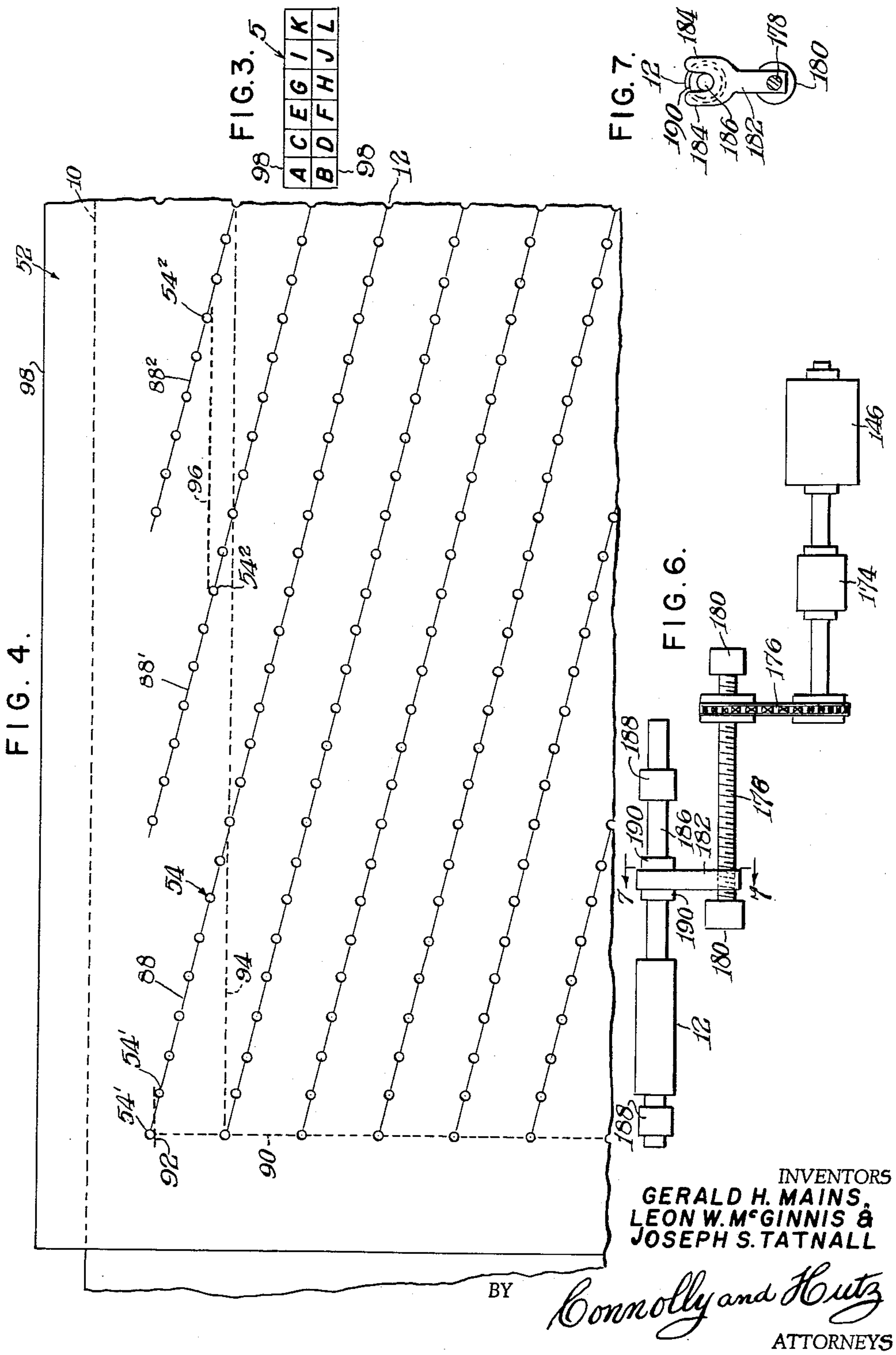
FIG. 3 is a schematic plan view of a novel head suitable for distributing a treating liquid on but one surface of a longitudinally moving strip.
FIG. 4 is a bottom plan view of section A of the head of FIG. 3 and includes the positioning of the edge of the strip with relation to section A of FIG. 3.
FIG. 6 is a top plan view of the mechanism associated with FIG. 5 and employed for obtaining proper strip tracking.
FIG. 7 is a cross-sectional view of FIG. 6 taken along the line 7—7.

Referring to FIGS. 3 and 4 of the drawings, FIG. 3 schematically illustrates the top surface 52 of distribution head 50. The particular head illustrated has been employed for treating copper foil of .00135 inch thickness and 13½ inch width over a treating length of approximately 6 feet with a strip feed of approximately three feet per minute. The top plan view of section A of FIG. 3 as illustrated in FIG. 4 includes a plurality of parallel rows 88 of ⅛ inch diameter orifices 54 arranged at an acute angle of approximately 14.37° to the direction of travel of strip 10. This particular angular relationship establishes a center-to-center distance in each transverse row 90 of approximately 1 inch and an offset transverse center-to-center distance between adjacent orifices in the same row 88 of approximately ⅛ inch. Since the diameters of orifices 54 are also ⅛ inch, this means that adjacent orifices in a row arranged at the acute angle to the direction of strip movement are tangent to a common line parallel to the direction of travel of the strip. This is illustrated by the line 92 arranged tangent to the adjacent orifices 54′ in the upper, left-hand corner of distribution member 52. By virtue of this arrangement, each orifice therefor subtends an incremental width of the strip and has another orifice subtending a contiguous incremental width of the strip.

It will further be noted in connection with FIG. 3 that there are an even multiple number of orifices 54 located on each line passing through the center of each orifice of the transverse row 90 and extending in a direction parallel to the direction of strip movement. Thus, for example, there are four such orifices along the line 94 of FIG. 4, it being apparent that there are 19 orifices so located along the length of the distribution head 52 as schematically illustrated in FIG. 3. This arrangement is a preferred arrangement in that it provides for uniform coverage of each incremental area of the strip treated. If, in the present illustration, the last two transverse rows 90 in sections K and L were not included, there would be but 17 orifices along a given line such as 94 and it would be found that along other lines parallel to that line, there would be a lesser or greater number of orifices. As a result, the increment of width subtended by the 22 orifices along that line would be exposed to a different volume of treating solution than would other incremental widths subtended by orifices located along other lines parallel to that line. As stated, this is a preferred arrangement in that it is an optimum arrangement for equal distribution of liquid over each incremental area. It will, however, be apparent to those skilled in the art that substantially the same number of orifices, e.g. a variation of one or two when 24 orifices lie, along a given line, will suffice to obtain a sufficient uniformity of treatment to comply with the uniformity requirements in many operations.

The liquid streams emerging through the orifices 54 impinge on the bottom surface of strip 10 and form a liquid pool which floats the strip 10 free of mechanical contact with the top of distribution head 52 and without wetting the top surface of strip 10. In order to provide sufficient surface area on the top of head 52 to form an adequate pool, it is desirable that the orifices be formed in a plate member 52 having two substantially parallel sides 98 arranged parallel to the direction of strip movement and spaced apart a distance greater than the width of the strip. The prescribed arrangement of orifices in such a plate member then forms an orifice-free border on each parallel side 98 of the plate member. The width of each border should be at least ½ the transverse distance between adjacent parallel rows of orifices for preferred results, i.e., ½ the distance between parallel rows 88 measured in the direction of the transverse row 90.

As previously indicated, the liquid velocity of the stream emerging through each orifice is of importance to the present invention. By the same token, the distance from the bottom surface of the strip 10 to the top surface of the distribution head 52 is also of importance because this distance taken in conjunction with the stream velocity will determine the force with which the liquid treating agent impinges against the bottom surface of the strip 10. It is found that when too high a liquid velocity is employed, the treated bottom surface may display a streaked effect indicating lack of uniformity of treatment. In the specific form of treatment employed for illustrating the present invention, i.e. oxidization of the bottom surface of a copper foil of 0.00135 inch thickness by the use of a liquid treating agent, the streaked effect is apparently due to removal of previously formed oxide coating and is therefore attributed to erosion brought about by an inordinately high liquid stream velocity. In this specific embodiment it has been found that with the orifice arrangement specifically described above in connection with FIGS. 3 and 4, control of liquid velocity to obtain a maximum height in the absence of the strip 10 of approximately ⅛ inch obtains uniformity of surface oxidization without wetting the top surface of the strip while floating the strip at a distance of about 3/32 inch above the distribution head 52. It will, however, be apparent to those skilled in the art that variations in orifice diameters and arrangements thereof, the nature of the material being treated, the nature of the surface treatment and other factors are controlling for the purpose of obtaining optimum results and these factors are readily determined in view of the teaching contained herein.

Reference has been made above to an orifice subtending an incremental width of the strip and having another orifice subtending a contiguous incremental width. Reference has also been made to preferred arrangements of orifice patterns wherein adjacent orifices in the same acutely arranged row are so arranged that they are tangent to a common line extending in a direction parallel to the direction of strip movement. As stated, this tangential arrangement is a preferred arrangement, it only being necessary that for each orifice subtending an incremental width of the strip there is another orifice subtending a contiguous incremental width. Thus the word "subtending" as used herein and in accordance with conventional usage also connotes an arrangement of each orifice with reference to some other orifice whereby the areas are contiguous by virtue of the inherent increase in size of the cross-sectional area of each emerging stream as it progresses from its emitting orifice. Thus, depending upon the liquid velocity as determined by the above-mentioned characteristics and the distance the strip 10 lies above the head 52, such above-referred to tangential relationship becomes one of approximate tangency insofar as the principles of the present invention are concerned. The preferred arrangement, however, being one in which the tangential relation exists.

Figure 5:
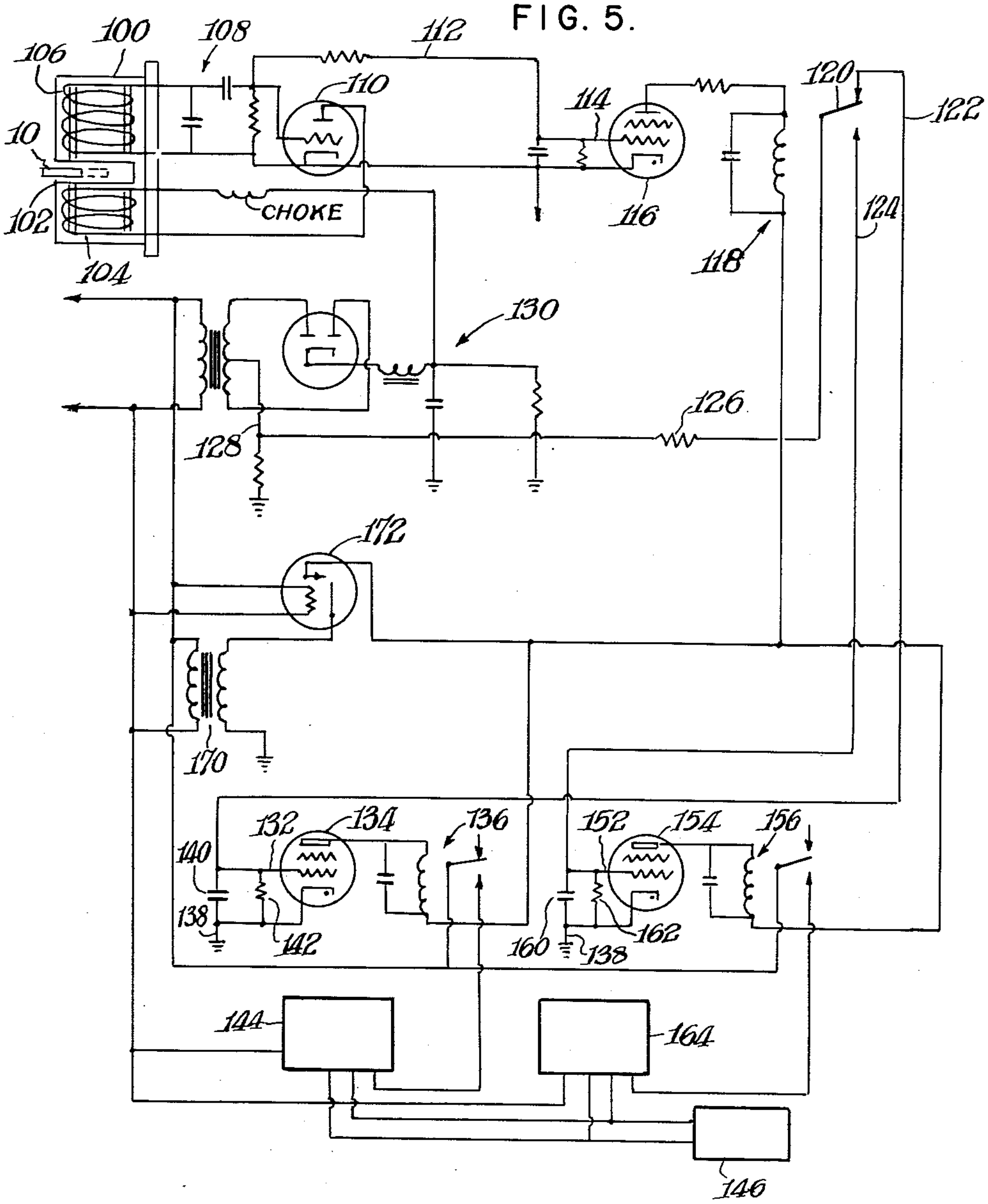
FIG. 5 is a schematic view of a circuit diagram forming a portion of a preferred tracking mechanism in accordance with the present invention.

Referring to FIG. 5 of the drawings, there is illustrated an electronic detecting means for sensing improper tracking of the strip 10 which would result in improper centering of the strip 10 over the distribution head 52. As previously stated, the width of the area of the distribution head 52 including orifices therein is less than the width of the strip 10 passing over the distribution head 52. For this reason certain lateral variation in the path of strip travel can be tolerated while still obtaining uniformity of treatment without wetting the upper surface of the strip 10. However, for maximum results, the preferred form of the present invention includes a device such as that shown in FIG. 5 for sensing improper tracking as well as apparatus subsequently to be described in connection with FIGS. 6 and 7 for compensating for the improper tracking as detected by the sensing means of FIG. 5. Although any form of sensing and compensating device which does not, in the case of the present embodiment, physically contact the strip will serve the purposes of the present invention, the illustrated form as shown in FIGS. 5–7 is a preferred form of device since it has been found that it is highly effective to the extent that the lateral excursion may be controlled within the limits of approximately ±0.005 inch.

The specific detector means of FIG. 5 employs a detecting head 100 having a slot 102 therein through which one edge of the strip 10 passes. The strip 10 functions as an electrostatic shield between two coils 104, 106 positioned on opposite sides of the slot. These coils are in turn connected in a feed-back loop of oscillator circuit 108 including vacuum tube 110, with the strip 10 arranged to vary the shielding between the two coils and thereby vary the effectiveness of the feed-back. Conductor 112 impresses the negative voltage that develops on the grid of the tube during oscillation, on the control electrode 114 of relay tube 116 in the plate circuit of which is connected the windings of relay 118. Armature 120 of this relay is normally biased so that with the relay winding deenergized it completes a circuit to line 122 but when the relay is energized the armature is pulled away from line 122 and into engagement with the line 124. The armature is itself connected through resistor 126 to the negative terminal 128 of a source of current. In the illustrated construction this terminal is an intermediate point in the circuit 130 that supplies the higher voltage current used to energize the oscillator 108.

Line 122 leads to the control electrode 132 of a relay tube 134 in the plate circuit of which are the windings of a second relay 136. Between control electrode 132 and the current return or ground 138, are connected in parallel a charging capacitor 140 and a bleeding resistor 142. Relay 136 is arranged to operate a power relay 144 that energizes electric motor 146 for operation in one direction, as for example forward, so as to cause the strip 10 to be laterally shifted to the left, as seen in the figure.

In a corresponding manner, line 124 is connected to control grid 152 of a third relay tube 154 for operating a relay 156 that controls a power relay 164 to energize motor 146 in the opposite or reverse direction to cause the sheet 10 to be shifted to the right. A charging capacitor 160 and a bleeding resistor 162 are also connected between the control electrode 152 and the circuit return.

As shown, the windings of relays 118, 136 and 156 are operated by alternating current rectified by the relay tubes and supplied by an isolation transformer 170, preferably through a warm-up delay switch 172 that keeps the energizing voltage from the relay tubes when the apparatus is switched on until after a short time delay which permits the tubes to warm up to operating temperature.

When the edge of strip 10 is too far to the left, the feed-back between the coils 104 and 106 will cause oscillation of oscillator 108 thereby impressing a negative voltage on control grid 114. This blocks the passage of current through relay tube 116 so that relay 118 is deenergized and armature 120 engages line 122. The negative voltage of source 128 is accordingly applied to control grid 132 of relay tube 134. However, the resistor 126 will cause the voltage to only gradually build up in charging capacitor 140 so that the relay tube 134 is not cut off until after an appreciable time delay. After this time delay, the power relay 144 is deenergized and stops motor 146 which could have been moving the strip to the left. Strip 10 will accordingly stop moving to the left.

In the meantime, the same dropping of the armature of line 120 against line 122 was accompanied by a disengagement from line 124. Capacitor 160, which might have previously been charged, accordingly begins to discharge through its bleeding resistor 162, until the negative voltage is sufficiently low to permit relay tube 154 to conduct. This conduction energizes the winding of relay 156 which in turn trips power relay 164 to drive motor 146 in the opposite or reverse direction to move the strip 10 towards the right.

In other words, if the motor 146 is moving strip 10 too far to the left, the apparatus will cause it to stop moving to the left and to start moving to the right. Correspondingly, if the strip moves too far to the right, the oscillation feed-back path is blocked sufficiently for the oscillation to stop, permitting relay tube 116 to conduct, thereby returning armature 120 to line 124. The effect of this is to stop the motion of the strip to the right and to start it moving to the left.

A feature of the apparatus of FIG. 5 is that the cut-off delays for relay tubes 134, 154 can be made shorter than the firing delays of these tubes, as by appropriate adjustment of the resistance 126 with respect to resistances 142 and 162. Accordingly, the application of the negative voltage from line 128 will fairly rapidly stop conduction through a relay tube and quickly deenergize the corresponding power relay. On the other hand, the disconnection of a control grid from source 128 will cause the charging capacitors to more gradually discharge so that the tubes will not become conductive until the lapse of a longer interval of time. In this way, a slight shift of the strip 10 in one direction will not cause motor 146 to reverse if the shift is promptly followed by a corresponding shift in the opposite direction. For most practical strip-moving speeds, a time delay of about seven seconds between the actuation of one power relay and the actuation of the other, is very effective and provides the above close tolerance in the position of the strip edge. Longer or shorter delays can also be used to give lesser or greater tolerances, or when the strip is moving exceedingly slowly or very rapidly. It is preferred, however, to have at least a few seconds delay since this is very helpful in keeping the motor from hunting, that is continuously switching to and fro too rapidly. Actually the apparatus can then operate with the motor not energized most of the time.

Although thyratrons are shown as relay tubes in FIG. 5, vacuum type tubes can be used instead. Furthermore, the relay tubes can be connected to directly operate the power relays without the intervening mechanical relays 136, 156, for example. The tubes can also be replaced by transistors, if desired. Instead of using the negative voltage of the oscillator grid, the control for relay tube 116 can be taken from the oscillations themselves which can first be rectified.

Some additional time delay can be obtained from a filter capacitor shunting electrode 114 to ground, but this delay is preferably only a small part of the entire delay.

As illustrated in FIGS. 6 and 7, the reversible electric motor 146 driving through a gear reduction unit 174 and sprocket and chain arrangement 176 rotates worm shaft 178 mounted in bearings 180. Depending upon the direction of rotation of the reversible electric motor 146 as determined by the position of strip 10 in slot 102 of detecting head 100, yoke 182 moves to the left or right as viewed in FIG. 6. The fingers 184 of yoke 182 receive the shaft 186 of parent feed roll 12, shaft 186 being mounted for rotation in and lateral movement through bearings 188. On either side of yoke 182 and adjacent thereto are positioned collars 190 fixed to shaft 186. By virtue of this arrangement, parent feed roll 12 is shifted either to the left or to the right as viewed in FIG. 6 as determined by the direction of movement of yoke 182. The lateral shifting of parent feed roll 12 as delayed by the time delay mechanism permits entry of strip 10 into driving rolls 14 with a maximum lateral tracking of ±0.005 inch while avoiding wrinkling. By this arrangement and proper adjustment of the alignment of rolls 14, 18, 22, and rewind coil 28, even when treating very thin copper foil, the strip 10 moves over the treating heads 52 and 60 with a minimum lateral deviation in its path while eliminating physical contact with the strip during the actual treatment or washing operations and during the sensing operation for assuring optimum tracking.

Although certain numerical data has been given above in connection with the preferred embodiment of the present invention, the following description will serve to completely illustrate the same. A copper foil strip of 13½ inches width and a thickness of 0.00135 inch was fed by driving rolls 14 at a speed of approximately three feet per minute and kept under constant tension by the driving action of rolls. An aqueous treating agent containing 1½ pounds of a 5-to-8 mixture of sodium chlorite and sodium hydroxide per gallon of water was pumped at a rate of approximately 40 gallons per minute via conduit 48 to distribution head 50. A plurality of parallel rows of ⅛ inch diameter orifices spaced apart a transverse center-to-center distance of one inch and arranged at an angle of approximately 14.37° to the direction of strip movement with a distance of approximately ½ inch between adjacent transversely extending rows 90 of orifices distributed this liquid on the bottom surface of the copper foil. The positioning of the supporting rolls 14, 18 and 22 taken in conjunction with the liquid velocity of the streams emerging from the so arranged orifices floated the strip on a liquid pool whose depth was approximately $^3/_{16}$ inch. There were 12 orifices in each transversely extending row 90 and 19 orifices having centers along each line 94. The dimensions of the total area of the distribution head 52 including the orifice-free border was 10 inches by 74 inches. After this treatment, the strip was washed in the countercurrent arrangement illustrated in FIG. 2 in which each orifice head 60 had the same arrangement of orifices except that there were but 7 orifices having centers along a line passing through the center of any one orifice and extending in a direction parallel to the direction of strip movement. Washing or rinsing water fed via conduit 66 to the last distribution head 60 was at a rate of approximately 20 gallons per minute and at a temperature of approximately 205° F. As the result of this washing or rinsing operation, the strip, after emerging from squeege rolls 22, was dry and free of any detectable residual treating agent salts. Thus, it was unnecessary to employ drying chamber 24. The strip then passed over tension rolls 26 and was rewound as coil 28. Upon examination, the strip was found to be uniformly oxidized on the bottom surface with no oxidization due to the treating liquid on the top surface. Upon bonding the treated copper foil surface to a dielectric material and etching to form a printed circuit, there were no observed failures of bonding.

This application is a divisional application of application Serial No. 544,564 filed November 2, 1955, and now U.S. Patent No. 2,993,492 of July 25, 1961.

We claim:

1. A process for uniformly treating the bottom surface of a longitudinally moving strip with a treating liquid comprising the steps of continuously advancing the strip along a substantially horizontal path over a treating zone and supporting the moving strip over the treating zone on a pool of liquid treating agent by impinging a pattern of liquid streams against the bottom surface of the moving strip, each liquid stream issuing from an individual zone subtending an incremental width of the strip and the spacings between individual zones being such that for each liquid stream issuing from an individual zone there is another liquid stream issuing from another individual zone subtending a contiguous incremental width of the strip.

2. The process as set forth in claim 1 including the step of maintaining strip movement along a substantially straight horizontal path over the treating zone in the absence of mechanical contact with the horizontally moving strip.

3. A process for uniformly treating the bottom surface of a longitudinally moving strip with a treating liquid comprising the steps of continuously advancing the strip along a substantially horizontal path over a treating zone and supporting the moving strip over the treating zone on a pool of liquid treating agent by impinging a pattern of liquid streams against the bottom surface of the moving strip, each liquid stream issuing from an individual zone subtending an incremental width of the strip and the spacings between individual zones being such that for each liquid stream issuing from an individual zone there is another liquid stream issuing from another individual zone subtending a contiguous incremental width of the strip, the volume of liquid impinged against any incremental width of the strip being substantially the same as the volume of liquid impinged against any other incremental width of the strip.

4. The process as set forth in claim 3 including the step of maintaining strip movement along a substantially straight horizontal path over the treating zone in the absence of mechanical contact with the horizontally moving strip.

5. A process for uniformly treating the bottom surface of a longitudinally moving strip with a treating liquid comprising the steps of continuously advancing the strip along a substantially horizontal path over a treating zone and supporting the moving strip over the treating zone on a pool of liquid treating agent by impinging a pattern of liquid streams against the bottom surface of the moving strip, each liquid stream issuing from an individual zone subtending an incremental width of the strip and the spacings between individual zones being such that for each liquid stream issuing from an individual zone there is another liquid stream issuing from another individual zone subtending a contiguous incremental width of the strip, and the width of the strip being greater than the width of the area of the treating zone containing the pattern of liquid stream issuing zones.

6. The process as set forth in claim 5 including the step of maintaining strip movement along a substantially straight horizontal path over the treating zone in the absence of mechanical contact with the horizontally moving strip.

References Cited in the file of this patent

UNITED STATES PATENTS

| | | |
|---|---|---|
| 1,998,192 | Haswell | Apr. 16, 1935 |
| 2,441,308 | Bond | May 11, 1948 |
| 2,619,098 | Walters | Nov. 25, 1952 |